(12) United States Patent
Burrus et al.

(10) Patent No.: US 6,286,317 B1
(45) Date of Patent: Sep. 11, 2001

(54) COOLING NUGGET FOR A LINER OF A GAS TURBINE ENGINE COMBUSTOR HAVING TRAPPED VORTEX CAVITY

(75) Inventors: David L. Burrus; Arthur W. Johnson; George E. Moertle, all of Cincinnati, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/215,862

(22) Filed: Dec. 18, 1998

(51) Int. Cl.[7] ........................................ F02C 3/14
(52) U.S. Cl. ............................ 60/752; 60/757; 60/758; 60/750
(58) Field of Search ...................... 60/737, 732, 749, 60/750, 751, 752, 754, 756, 757, 758, 759, 760

(56) References Cited

U.S. PATENT DOCUMENTS

| 3,430,443 | * | 3/1969 | Richardson et al. | 60/758 |
| 3,952,503 | * | 4/1976 | Fox et al. | 60/757 |
| 4,051,670 | * | 10/1977 | Pierce | 60/755 |
| 4,104,874 | * | 8/1978 | Caruel et al. | 60/757 |
| 4,365,477 | * | 12/1982 | Pearce | 60/756 |
| 4,749,029 | * | 6/1988 | Becker et al. | 60/755 |
| 5,129,447 | * | 7/1992 | Hamner | 60/752 |
| 5,265,425 | * | 11/1993 | Howell | 60/736 |
| 5,319,923 | * | 6/1994 | Leonard et al. | 60/737 |
| 5,619,855 |   | 4/1997 | Burrus | 60/736 |
| 5,791,148 |   | 8/1998 | Burrus | 60/752 |

FOREIGN PATENT DOCUMENTS

| 2073396 | * | 10/1981 | (GB) | 60/758 |
| 2099978 | * | 12/1982 | (GB) | 60/758 |

* cited by examiner

Primary Examiner—Ted Kim
(74) Attorney, Agent, or Firm—Andrew C. Hess; Rodney M. Young

(57) ABSTRACT

A liner for a gas turbine engine combustor, including an upstream section, a downstream section oriented at an angle to the upstream liner section, and a cooling nugget joining the upstream and downstream liner sections for providing mechanical stiffness at a junction of the upstream and downstream liner sections. The cooling nugget further includes a first portion connected to the upstream liner section, a second portion connected to the downstream liner section, and a third portion joining the first and second cooling nugget portions at a first end, the third cooling nugget portion extending radially from the first end, wherein the cooling nugget is in flow communication with a cool air supply and is configured to provide a starter film of cooling air along respective surfaces of the upstream liner section and the downstream liner section.

18 Claims, 2 Drawing Sheets

COOLING NUGGET FOR A LINER OF A GAS TURBINE ENGINE COMBUSTOR HAVING TRAPPED VORTEX CAVITY

The Government has rights to this invention pursuant to Contract No. F33615-93-C-2305 awarded by the United States Air Force.

BACKGROUND OF THE INVENTION

1. Field of the Invention

The present invention relates to a liner for a gas turbine engine combustor having a trapped vortex cavity and, more particularly, to an annular cooling nugget connecting a cavity liner section with a downstream liner section.

2. Description of Related Art

Advanced aircraft gas turbine engine technology requirements are driving the combustors therein to be shorter in length, have higher performance levels over wider operating ranges, and produce lower exhaust pollutant emission levels. One example of a combustor designed to achieve these objectives is disclosed in U.S. Pat. No. 5,619,855 to Burrus. As seen therein, the Burrus combustor is able to operate efficiently at inlet air flows having a high subsonic Mach Number. This stems in part from a dome inlet module which allows air to flow freely from an upstream compressor to the combustion chamber, with fuel being injected into the flow passage. The combustor also has inner and outer liners attached to the dome inlet module which include upstream cavity portions for creating a trapped vortex of fuel and air therein, as well as downstream portions extending to the turbine nozzle.

It has been found in the aforementioned Burrus combustor that hot gases from the cavity combustion zones, having high temperatures and moderately high velocities, impinge on a corner junction where the cavity section of the respective liner joins the remaining downstream liner section. This results in high heat loads on such junction of the liner. While a cooling passage is disclosed in the '855 patent at the upstream end of the downstream liner section to initiate cooling flow along the surface thereof, additional cooling is required at both the corner junction itself and along the rear surface of the cavity liner section. Moreover, the corner junction of the cavity liner section and the downstream liner section is challenged structurally and measures which would also strengthen this area are likewise needed.

Accordingly, it would be desirable for a liner to be developed in which the junction between a cavity liner section and a downstream liner section would have greater structural stability. Further, it would be desirable if such liner would provide greater cooling at this location and along the rear portion of the cavity liner section.

SUMMARY OF THE INVENTION

In accordance with one aspect of the present invention, a liner for a gas turbine engine combustor is disclosed as including an upstream section, a downstream section oriented at an angle to the upstream liner section, and an annular cooling nugget joining the upstream and downstream liner sections for providing mechanical stiffness at a junction of the upstream and downstream liner sections. The cooling nugget further includes a first portion connected to the upstream liner section, a second portion connected to the downstream liner section, and a third portion joining the first and second cooling nugget portions at a first end, the third cooling nugget portion extending radially from the first end, wherein the cooling nugget is in flow communication with a cool air supply and is configured to provide a starter film of cooling air along respective surfaces of the upstream liner section and the downstream liner section.

In accordance with a second aspect of the present invention, a cooling nugget for joining adjacent sections of a gas turbine engine liner is disclosed, wherein the liner sections are oriented at an angle with respect to each other. The cooling nugget includes a first portion connected to an upstream liner section, a second portion connected to a downstream liner section, and a third portion joining the first and second portions at a first end. The third portion extends radially from the first end, wherein the third portion is in flow communication with a cool air supply and is configured to provide a starter film of cooling air along respective surfaces of the upstream liner section and the downstream liner section. The cooling nugget third portion further includes a first flange portion connected to a second end of the third portion, the first flange portion being spaced from and oriented parallel to the upstream liner section, as well as a second flange portion connected to the second end of the third portion, the second flange portion being spaced from and oriented parallel to the downstream liner section.

In accordance with a third aspect of the present invention, an annular cooling nugget for joining adjacent sections of a gas turbine engine liner is disclosed, wherein the liner sections are oriented at an angle with respect to each other. The cooling nugget includes a first portion connected to an upstream liner section, a second portion connected to a downstream liner section, and a third portion joining the first and second portions at a first end. The third portion extends radially from the first end and has a plurality of spaced cooling passages incorporated therein, wherein the cooling nugget third portion is in flow communication with a cool air supply and is configured so as to provide cooling air at the junction of the upstream liner section and the downstream liner section.

BRIEF DESCRIPTION OF THE DRAWING

While the specification concludes with claims particularly pointing out and distinctly claiming the present invention, it is believed that the same will be better understood from the following description taken in conjunction with the accompanying drawing in which:

DETAILED DESCRIPTION OF THE INVENTION

Figure 1:
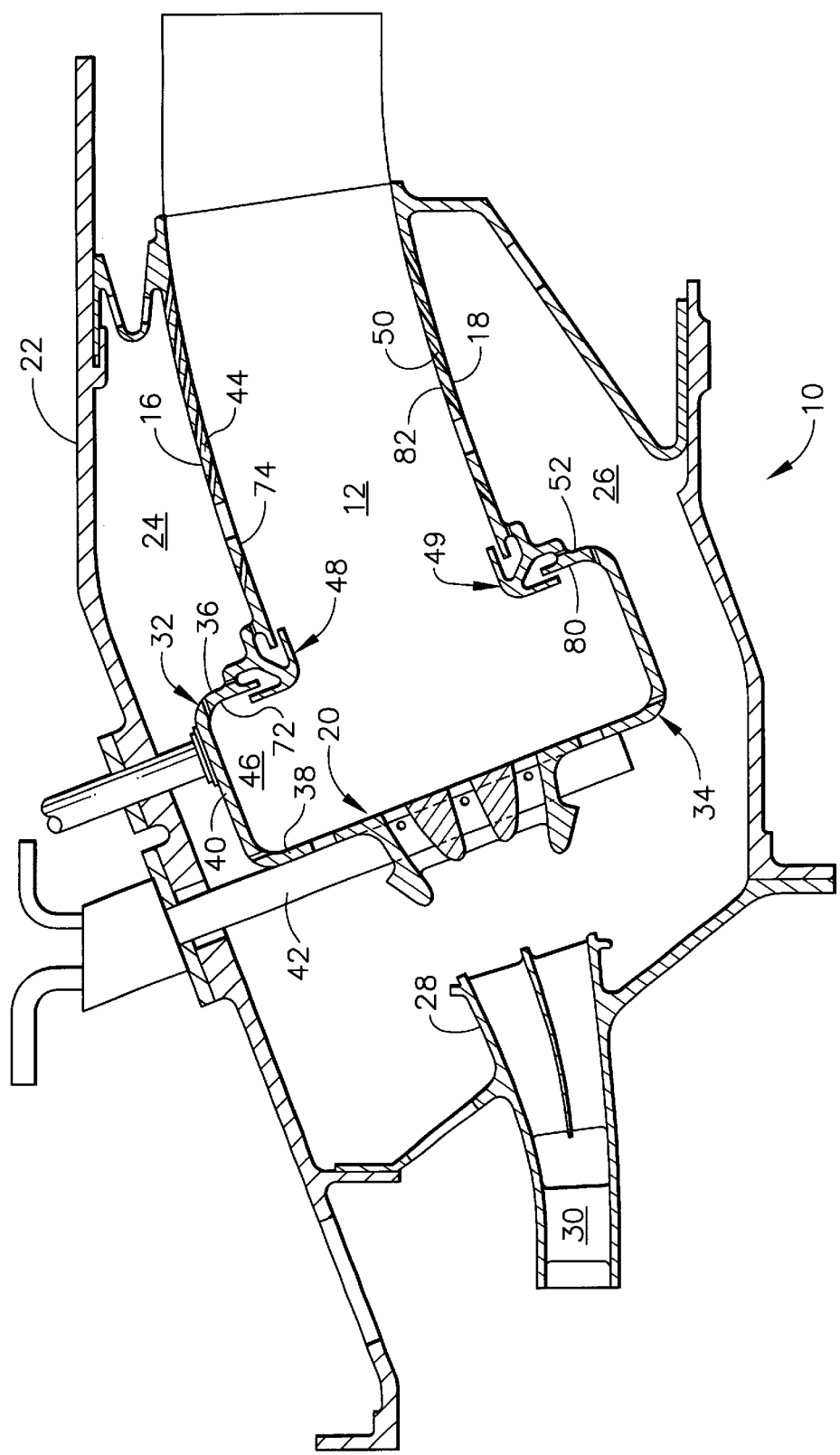
FIG. 1 is a longitudinal cross-sectional view of a gas turbine engine combustor having a liner in accordance with the present invention.

Referring now to the drawing in detail, wherein identical numerals indicate the same elements throughout the figures, FIG. 1 depicts a combustor 10 which comprises a hollow body defining a combustion chamber 12 therein. Combustor 10 is generally annular in form about an axis 14 and is further comprised of an outer liner 16, an inner liner 18, and a dome inlet module designated generally by the numeral 20. A casing 22 is preferably positioned around combustor 10 so that an outer radial passage 24 is formed between casing 22 and outer liner 16 and an inner passage 26 is defined between casing 22 and inner liner 18.

It will be appreciated that dome inlet module 20 may be like that shown and disclosed in U.S. Pat. No. 5,619,855 to Burrus, which is also owned by the assignee of the current invention and is hereby incorporated by reference. Instead, FIG. 1 depicts combustor 10 as having a different dome inlet module 20 where it is separate from a diffuser 28 located upstream thereof for directing air flow from an exit end 30 of a compressor. Dome inlet module 20 is described in more detail in another patent application filed concurrently herewith entitled "Fuel Injector Bar For Gas Turbine Engine Combustor Having Trapped Vortex Cavity," and is hereby incorporated by reference. It will be appreciated that liners 16 and 18 of the present invention may be utilized in either design and reference is made to the aforementioned patent and patent application for greater detail regarding dome inlet module 20 of combustor 10.

It will be noted that achieving and sustaining combustion in such a high velocity flow is difficult and likewise carries downstream into combustion chamber 12 as well. In order to overcome this problem within combustion chamber 12, some means for igniting the fuel/air mixture and stabilizing the flame thereof is required. Preferably, this is accomplished by the incorporation of a trapped vortex cavity depicted generally by the number 32, formed at least in outer liner 16. A similar trapped vortex cavity 34 is preferably provided in inner liner 18 as well. Cavities 32 and 34 are utilized to provide a trapped vortex of fuel and air, as discussed in the aforementioned '855 patent. It will be appreciated that further description is primarily directed toward outer liner 16 and its cavity 32, but is also applicable in like manner to inner liner 18 and cavity 34 formed therein.

With respect to outer liner 16, trapped vortex cavity 32 is incorporated immediately downstream of dome inlet module 20 and is shown as being substantially rectangular in shape (although cavity 32 may be configured as arcuate in cross-section). Cavity 32 is open to combustion chamber 12 so that it is formed by an aft wall 36, a forward wall 38, and an outer wall 40 formed therebetween which preferably is substantially parallel to outer liner 16. While fuel may enter trapped vortex cavity 32 through a fuel injector centered within a passage in aft wall 36, as shown in U.S. Pat. No. 5,619,855, it is preferred that the fuel be injected through forward wall 38 by means of fuel injector bar 42 as discussed in the above-referenced patent application.

It will be noted in the '855 patent that cavity 32 (i.e., aft wall 36) is connected directly to a downstream section 44 of outer liner at a corner area (not identified). Further analysis of this design has revealed that this corner area is subject to high heat loads caused by hot gases from a combustion zone 46 within cavity 32 which impinge thereon with high temperatures and moderately high velocities. Moreover, it has been found that this corner area is a weak point structurally within liner 16.

In order to address these concerns, as well as improve the vortex flow within cavities 32 and 34, the present invention introduces annular cooling nuggets 48 and 49, respectively, for joining cavity liner sections 32 and 34 with downstream liner sections 44 and 50 of outer liner 16 and inner liner 18. It will also be appreciated that aft walls 36 and 59 of outer cavities 32 and 34 are oriented substantially perpendicular to downstream liner sections 44 and 50, and preferably within a range of approximately 75° to approximately 105°.

Figure 2:
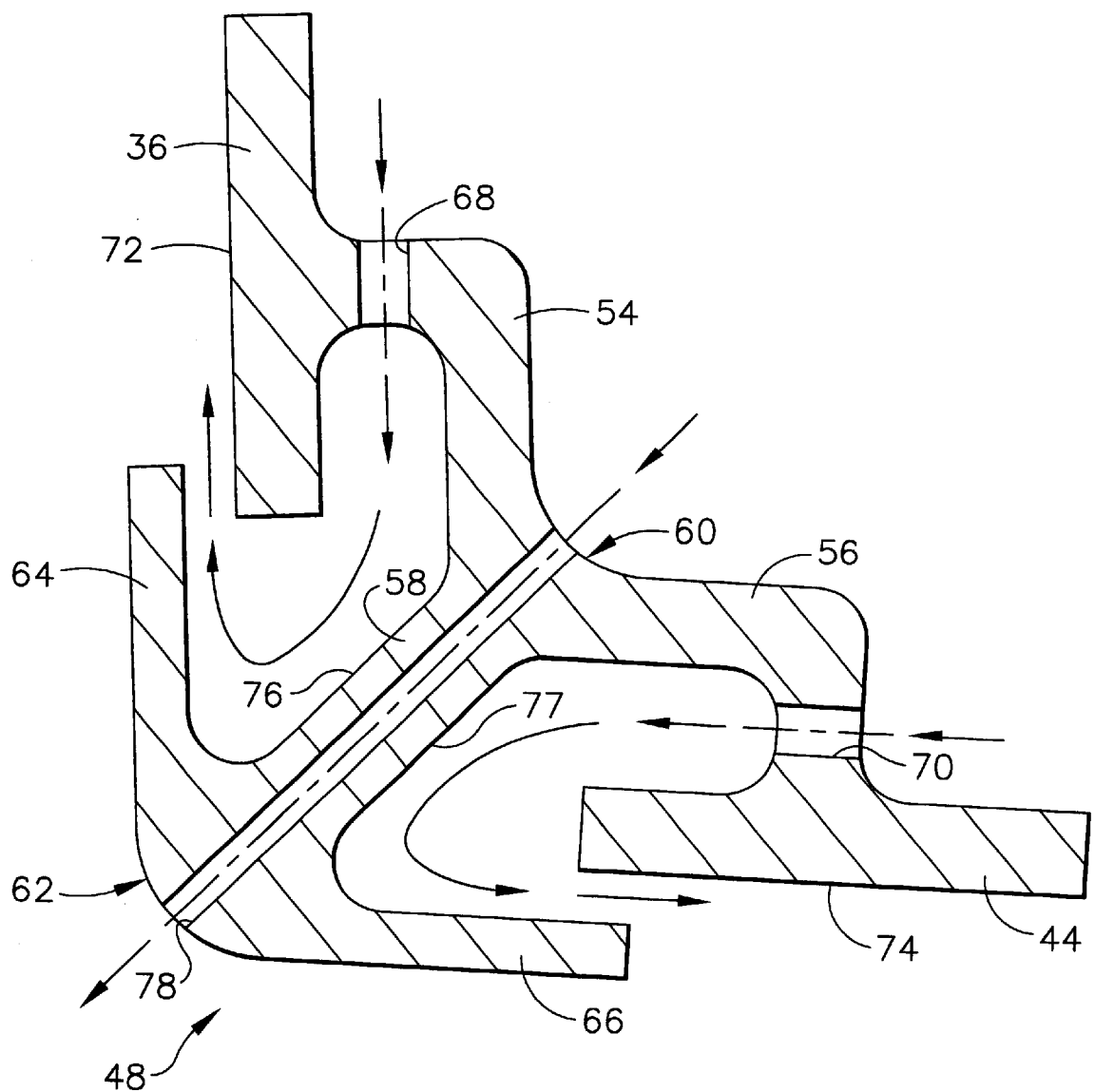
FIG. 2 is an enlarged, longitudinal cross-sectional view of the corner cooling nugget depicted in FIG. 1.

As best seen in FIG. 2. cooling nugget 48 includes a first portion 54 connected to cavity liner section 32 at aft wall 36, a second portion 56 connected to downstream liner section 44, and a third portion 58 joining first and second portions 54 and 56 at a first end 60. It will be noted that third cooling nugget portion 58 extends radially inward from first end 60 to a second end 62. A first flange portion 64 is connected to second end 62 of third cooling nugget portion 58, as is a second flange portion 66, where first flange portion 64 is preferably spaced from and oriented substantially parallel to aft wall 36 and second flange portion 66 is preferably spaced from and oriented substantially parallel to downstream liner section 44. In this way, first and second flange portions 64 and 66 act to form a heat shield at the junction of cavity liner section 32 and downstream liner section 44.

It will be appreciated that third cooling nugget portion 58 is in flow communication with a cooling air supply (e.g., bypass air available from within outer passage 24) via a plurality of annularly spaced cooling passages 68 within first cooling nugget portion 54 and a plurality of annularly spaced cooling passages 70 within second cooling nugget portion 56. In this way, the structure of cooling nugget 48 is able to be kept cool and thereby maintain its mechanical stiffness to support the junction between cavity liner section 32 and downstream liner section 44. Moreover, cooling nugget 48 is configured to provide a starter film of cooling air along surface 72 of aft wall 36 and surface 74 of downstream liner section 44. Alternatively, cooling passages 68 and 70 may be formed within aft wall 36 and downstream liner section 44 to permit the flow communication between the cooling air supply and third cooling nugget portion 58. Since the angle between cooling passages 68 and 70 will typically correspond to the angle between aft wall 36 and downstream liner section 44, it will also preferably fall in the range of approximately 75° to approximately 105°.

More specifically, it will be seen that first cooling nugget portion 54, first flange portion 64, and a surface 76 of third cooling nugget portion 58 are configured so as to direct cooling air along outer cavity aft wall surface 72. Likewise, second cooling nugget portion 56, second flange portion 66, and a surface 77 of third cooling nugget portion 58 are configured so as to direct cooling air along surface 74 of outer downstream liner section 44. It will also be understood that starter films of cooling air are likewise provided by cooling nugget 49 of the present invention along surface 80 of inner cavity aft wall 52 and surface 82 of inner downstream liner section 50. Besides assisting cooling of liners 16 and 18, the vortex flows within cavities 32 and 34 are enhanced by the cooling air provided to aft wall surfaces 72 and 80.

In order to assist in cooling the area along first and second flange portions 64 and 66, a series of spaced cooling passages 78 may be provided through middle portion 76 of third cooling nugget portion 58. This permits flow communication from a cooling air supply directly to the area where cavity liner section 32 and downstream liner section 44 are joined.

Having shown and described the preferred embodiment of the present invention, further adaptations of the liner can be accomplished by appropriate modifications by one of ordinary skill in the art without departing from the scope of the invention. In particular, it will be noted that while the cooling nugget specifically described herein is with respect to cooling nugget 48 and outer liner 16, the same also applies to cooling nugget 49 and inner liner 18. Moreover, even though the combustor liner described herein has a trapped vortex cavity, the present invention can be utilized with any liner having adjacent sections which are oriented at an angle with respect to each other.

What is claimed is:

1. A liner for a gas turbine engine combustor, said liner comprising:
   (a) a first section including a cavity, said cavity further comprising;
      (1) an aft wall;
      (2) a forward wall; and
      (3) all intermediate wall connected to said aft wall at one end and said forward wall at the other end;
   (b) a second section oriented substantially perpendicular to said aft wall of said first section; and (c) an annular cooling nugget joining said first and second liner sections for providing mechanical stiffness at a junction of said first and second liner sections, said cooling nugget further comprising:
  (1) a first portion connected to said aft wall of said first liner section;
  (2) a second portion connected to said second liner section; and
  (3) a third portion joining said first and second cooling nugget portions at a first end, said third cooling nugget portion extending radially from said first end with respect to a longitudinal axis through said gas turbine engine;
  wherein said cooling nugget is in flow communication with a cool air supply and is configured to provide a starter film of cooling air along respective surfaces of said first liner section and said second liner section.

2. The liner of claim 1, wherein said first liner section is substantially rectangular in shape.

3. The liner of claim 1, said first and second cooling nugget portions having a plurality of annularly spaced cooling passages incorporated therein in flow communication which said third cooling nugget portion.

4. The liner of claim 3, said cooling passages of said first and second cooling nugget portions being oriented at a specified angle with respect to each other.

5. The liner of claim 4, said specified angle being within a range of approximately 75° to approximately 105°.

6. The liner of claim 1, said first and second liner sections having a plurality of annularly spaced cooling passages incorporated therein in flow communication with said third cooling nugget portion.

7. The liner of claim 1, said third cooling nugget portion further comprising;
  (a) a first flange portion connected to a second end of said third cooling nugget portion, said first flange portion being spaced from and oriented parallel to said aft wall of said first liner section; and
  (b) a second flange portion connected to said second end of said third cooling nugget portion, said second flange portion being spaced from and oriented parallel to said second liner section.

8. The liner of claim 7, wherein said first cooling nugget portion, said first flange portion of said third cooling nugget portion, and a surface of said third cooling nugget portion are configured so as to direct said cool air along a surface of said aft wall of said first liner section.

9. The liner of claim 7, wherein said second cooling nugget portion, said second flange portion of said third cooling nugget portion, and a surface of said third cooling nugget portion are configured so as to direct said cool air along a surface of said second liner section.

10. The liner of claim 7, said first and second flanges of said third cooling nugget portion forming a heat shield at the junction of said first and second liner sections.

11. The liner of claim 1, said third cooling nugget portion having a plurality of spaced cooling passages incorporated therein in flow communication with a cool air supply, wherein heat loads at the junction of said first and second liner sections are reduced.

12. The liner of claim 1, wherein said liner is an inner liner of said combustor.

13. The liner of claim 1, wherein said liner is an outer liner of said combustor.

14. A cooling nugget for joining adjacent sections of a gas turbine engine liner, said cooling nugget comprising:
  (a) a first portion connected to a first liner section including a cavity, said cavity further comprising;
    (1) an aft wall;
    (2) a forward wall; and
    (3) an intermediate wall connected to said aft wall at one end and said forward wall at the other end;
  (b) a second portion connected to a second liner section, wherein said second liner section is oriented substantially perpendicular to said aft wall of mid first liner section; and
  (c) a third portion joining said first and second portions at a first end, said third portion extending radially from said first end with respect to a longitudinal axis through said gas turbine engine;
  wherein said cooling nugget third portion is in flow communication with a cool air supply and is configured to provide a starter film of cooling air along respective surfaces of said aft wall of said first liner section and said second liner section.

15. The cooling nugget of claim 14, wherein said starter film of cooling air along the surface of said aft wall of said first liner section assists in driving a vortex flow in said cavity.

16. The cooling nugget of claim 14, said third portion further comprising:
  (a) a first flange portion connected to a second end of said third portion, said first flange portion being spaced from and oriented parallel to said aft wall of said first liner section; and
  (b) a second flange portion connected to said second end of said third portion, said second flange portion being spaced from and oriented parallel to said second liner section;
  wherein said cooling nugget first portion, said first flange portion of said cooling nugget third portion, and a first surface of said cooling nugget third portion are configured to receive and direct said cool air along a surface of said first liner section and said cooling nugget second portion, said second flange portion of said cooling nugget third portion, and a second surface of said cooling nugget third portion are configured to receive and direct said cool air along a surface of said second liner section.

17. The cooling nugget of claim 16, said fist and second flanges of said cooling nugget third portion forming a heat shield at a junction of said first and second liner sections.

18. A cooling nugget for joining adjacent sections of a gas turbine engine liner, said cooling nugget comprising:
  (a) a first portion connected to a first liner section including a cavity, said cavity further comprising;
    (1) an aft wall;
    (2) a forward wall; and
    (3) an intermediate wall connected to said aft wall at one end and said forward wall at the other end;
  (b) a second portion connected to a second liner section, wherein said second liner section is oriented substantially perpendicular to said aft wall of said first liner section; and
  (c) a third portion joining said first and second portions at a first end, said third portion extending radially with respect to a longitudinal axis through said gas turbine engine and having a plurality of spaced cooling passages incorporated therein;
  wherein said cooling nugget third portion is in flow communication with a cool air supply and is configured so as to provide cool air at a junction of said aft wall of said first liner section and said second liner section.

* * * * *